United States Patent

Hatakeyama

(10) Patent No.: US 12,210,270 B2
(45) Date of Patent: Jan. 28, 2025

(54) OPTICAL APPARATUS, LENS APPARATUS AND CAMERA APPARATUS

(71) Applicant: CANON KABUSHIKI KAISHA, Tokyo (JP)

(72) Inventor: Yasuhiro Hatakeyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 18/186,096

(22) Filed: Mar. 17, 2023

(65) Prior Publication Data

US 2023/0305368 A1    Sep. 28, 2023

(30) Foreign Application Priority Data

Mar. 24, 2022 (JP) .................... 2022-047760

(51) Int. Cl.
| | |
|---|---|
| *G03B 17/18* | (2021.01) |
| *G03B 13/36* | (2021.01) |
| *G03B 17/14* | (2021.01) |

(52) U.S. Cl.
CPC ............. *G03B 17/18* (2013.01); *G03B 13/36* (2013.01); *G03B 17/14* (2013.01)

(58) Field of Classification Search
CPC ......... G03B 17/18; G03B 13/36; G03B 17/14
See application file for complete search history.

(56) References Cited

U.S. PATENT DOCUMENTS

| | | | | |
|---|---|---|---|---|
| 2021/0400180 A1* | 12/2021 | Omata | ...................... | G06T 7/80 |
| 2023/0097922 A1* | 3/2023 | Asawa | ................... | H04N 23/62 |
| | | | | 348/333.01 |
| 2024/0036438 A1* | 2/2024 | Hirama | .................. | H04N 23/64 |

FOREIGN PATENT DOCUMENTS

JP          2005266658 A       9/2005

\* cited by examiner

*Primary Examiner* — Shahbaz Nazrul (74) *Attorney, Agent, or Firm* — Canon U.S.A., Inc. IP Division (57) ABSTRACT

An optical apparatus including camera and lens apparatuses detachable from each other, in which the lens apparatus includes an optical system, a driver driving a focus lens unit of the optical system, a detector detecting a focus lens unit position, a storage storing the focus lens unit position, a registering operator causing the storage to store the focus lens unit position as a registered position, a recall operator causing the driver to drive the focus lens unit to the registered position, and a lens communicator communicating with the camera apparatus.

18 Claims, 7 Drawing Sheets

OPTICAL APPARATUS, LENS APPARATUS AND CAMERA APPARATUS

BACKGROUND

Technical Field

The aspect of the embodiments relates to an optical apparatus, a lens apparatus, and a camera apparatus.

Description of the Related Art

In lens apparatuses, a focus preset function is to recall an arbitrary focus position which is pre-set. With this function, by registering a focus position (object distance) in advance for an object that can be assumed, it becomes possible to instantly and surely focus on the target object when the assumed scene occurs.

Japanese Patent Application Laid-Open No. 2005-266658 discloses a lens apparatus provided with a plurality of storage units capable of registering any focus position and a restoration button which corresponds to a registration button and can recall the stored position.

In one embodiment, an operation of the focus preset function provides a visual feedback in terms of the perception of settings being made and the registered position.

Japanese Patent Application Laid-Open No. 2005-266658 discloses a focus preset function that allows registration of multiple points. However, if the operating means related to the registration of the multiple points are concentrated in one place, there is a risk that a user may unintentionally recall a registered position when recalling it at a time of picking up image.

SUMMARY

According to the aspect of the embodiments, an optical apparatus includes a camera apparatus and a lens apparatus attachable to and detachable from the camera apparatus, in which the lens apparatus includes an optical system, a driving unit configured to drive a focus lens unit included in the optical system, a detector configured to detect a position of the focus lens unit, a first storage unit configured to store a position of the focus lens unit, a first registering operation unit configured to cause the first storage unit to store a position of the lens unit as a first registered position, a first recall operation unit configured to cause the driving unit to drive the focus lens unit to the first registered position, and a lens communication unit configured to communicate with the camera apparatus, in which the camera apparatus include a camera communication unit configured to communicate with the lens apparatus and an image pickup element configured to pickup an image formed by the lens apparatus, and in which an information communicated between the lens communication unit and the camera communication unit includes an operation information of at least one of the first registered operation unit and the first recall operation unit, and a position information based on a detection by the detector.

Further features of the disclosure will become apparent from the following description of exemplary embodiments with reference to the attached drawings.

DESCRIPTION OF THE EMBODIMENTS

The exemplary embodiment of the disclosure is described below in detail based on the accompanying drawings. It should be noted that the drawings shown below are drawn on a scale different from the actual one in order to make the present embodiment easily understandable.

Embodiment 1

Figure 1:
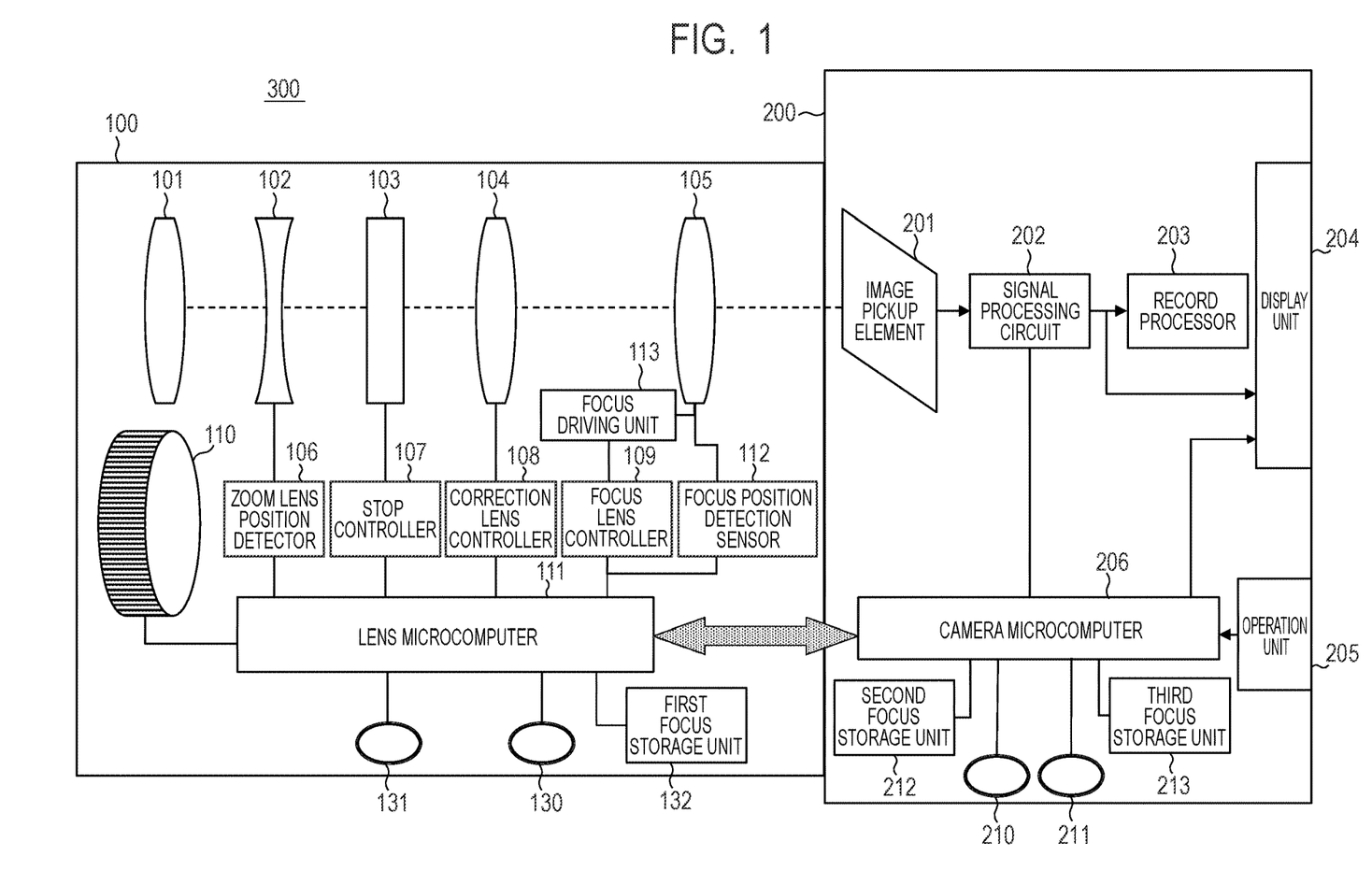
FIG. 1 is a block diagram showing a camera body and an interchangeable lens of the disclosure.

FIG. 1 is a block diagram showing an example of the configuration of an optical apparatus according to an embodiment of the disclosure.

1. An Optical Apparatus of this Embodiment
[Configuration of Optical Apparatus]

An optical apparatus 300 consists of an interchangeable lens (a lens apparatus) 100 and a camera body (a camera apparatus) 200 configured to be mountable/detachable to/from the interchangeable lens 100.

First, a specific configurations of the interchangeable lens 100 and the camera body 200 will be described.

The interchangeable lens 100 is mechanically and electrically connected to the camera body 200 through a mount (not shown). The interchangeable lens 100 receives electric power from the camera body 200 through a power supply terminal (not shown) provided on the mount described above. Power received from the camera body 200 is then used to control various actuators and a lens microcomputer 111, which will be described later. The camera body 200 communicates with the interchangeable lens 100 through a communication terminal (not shown) provided on the mount described above, and controls the interchangeable lens 100 by communicating control commands.

[Configuration of Camera Body]

The configuration of the camera body 200 is described. The camera body 200 is provided with an image pickup element 201 including a phase-difference AF sensor and the like, a signal processing circuit 202, a record processing unit 203, a display unit 204, an operation unit 205 and a camera microcomputer 206. The camera body 200 of embodiment 1 is provided with a camera preset button (a second registering operation unit) 210, a camera recall button (a second recall operation unit) 211, a second focus storage unit (a third storage unit) 212 and a third focus storage unit (a second storage unit) 213.

The image pickup element 201 photoelectrically converts an object image formed by an image pickup optical system in the interchangeable lens 100 and outputs an electrical signal (an analog signal). An A/D conversion circuit (not shown) converts the analog signal from the image pickup element 201 into a digital signal.

The signal processing circuit 202 performs various image processing's on the digital signal from the A/D conversion circuit to generate an image signal. The signal processing circuit 202 also generates, from image signal, a contrast state of the object image, that is, a focus information indicating a focus state of the image pickup optical system and a brightness information indicating an exposure state.

The signal processing circuit 202 outputs the image signal to the display unit 204, and the display unit 204 display image signal as a live view image used for checking composition, focus state, etc. Specifically, the display unit 204 is a rear liquid crystal display or an electronic viewfinder of the camera body 200. Furthermore, the signal processing circuit 202 outputs the image signal to the record processing unit 203, and the record processing unit 203 stores the image signal as a still image or a moving image data in an external memory or the like.

The camera microcomputer 206 as a camera controller controls the camera body 200 in response to an inputs such as an imaging instruction switch and various setting switches of the operation unit 205. The camera microcomputer 206 also processes operations of the camera preset button 210 and the camera recall button 211, which are the operation units that operate the focus preset function which is a feature of the disclosure.

The camera microcomputer 206 transmits, to lens microcomputer 111 via camera communication unit (camera communication unit), a control command regarding focusing operation of the focus lens 105 in response to the AF information generated from the output of a phase difference detection pixel (not shown) provided in the image pickup element. The second focus storage unit 212 and the third focus storage unit 213 are storage units of focus position information associated with the focus preset function, described below.

[Configuration of Interchangeable Lens]

The configuration of the interchangeable lens 100 will be described. The interchangeable lens 100 has an image pickup optical system, a drive unit that is a driving unit of the image pickup optical system, a controller that controls the drive unit, a detector that detects a position of the optical element, a focus lens operation ring 110, the lens microcomputer 111, and a focus position sensor 112. Furthermore, a lens preset button (a first registering operation unit) 130, a lens recall button (a first recall operation unit) 131, and a first focus storage unit (a first storage unit) 132 are provided as configurations for realizing the focus preset function of this embodiment.

The lens microcomputer 111 is a controller for controlling an operation of each part in the interchangeable lens 100. The lens microcomputer 111 receives a control command sent from the camera body 200 via the lens communication unit and receives a request to transmit a lens data or a request to receive a camera data. In addition, the lens microcomputer 111 performs controlling of the lens corresponding to the control command, transmits the lens data corresponding to the transmission request to the camera body 200, and receives a data from the camera when receiving a reception request. The lens microcomputer 111 performs a light quantity adjustment and a focus adjustment processing, which will be described later, in response to commands related to light quantity adjustment and focusing among control commands.

The image pickup optical system includes a field lens 101, a zoom lens 102 for zooming, an aperture stop unit 103 for adjusting an amount of light, an image stabilization lens 104, and a focus lens 105 for focusing.

The zoom lens 102 is movable in an optical axis direction indicated by a dashed line in FIG. 1, and is driven in the optical axis direction by the user operating the zoom operation ring connected to a zoom mechanism (not shown). The zoom lens 102 is moved to perform zooming that changes a focal length of the image pickup optical system. A zoom lens position detector 106 detects a zoom lens position using a position detector such as a variable resistance and outputs a position data to the lens microcomputer 111. The output position data is used to generate a focal length information in the lens microcomputer 111.

The aperture stop unit 103 is configured with a sensor such as aperture stop blades and a photo interrupter. A state of the aperture stop blade is detected by the sensor and output to the lens microcomputer 111. In response to a command from the lens microcomputer 111, an aperture stop control unit 107 outputs a drive signal to drive an actuator such as a stepping motor and a voice coil motor. Thus, the light quantity is adjusted by the aperture stop unit 103.

The image stabilization lens 104 is moved in a direction perpendicular to the optical axis of the image pickup optical system to reduce an image blur caused by shaking or the like. In response to a vibration detected by a vibration sensor (not shown) such as a vibration gyroscope, the image stabilization lens controller 108, which is a controller, outputs a drive signal to drive an image stabilization actuator by a command from the lens microcomputer 111. Thus, the image stabilization is performed to control a shift movement of the image stabilization lens 104.

The focus lens 105 is movable in the optical axis direction indicated by the dashed line in the figure. A position of the focus lens 105 is detected using the focus position sensor 112 such as a photo interrupter, and the detected position data is output to the lens microcomputer 111. Based on a command from the lens microcomputer 111, a focus lens controller 109 outputs a drive signal to drive the focus driving unit 113 and performs the focus adjustment by moving the focus lens 105.

[Focus Function (AF/MF)]

As a focus function that drives the focus lens 105 to adjust focus, an AF that automatically adjusts focus, an MF that manually adjusts focus, and a focus preset that moves the focus lens to a preset position, which is a feature of the disclosure, are provided.

To execute the focus function, the lens communication unit transmits a focus position information to the camera microcomputer 206 in response to a request to transmit the lens data and receives a focus driving command in response to a request to receive the camera data.

The focus position information is an information generated by the lens microcomputer 111 based on the information from the focus position sensor 112. The focus position information is composed of information such as image pickup distance information (optical characteristic information, in-focus distance, object distance) and address information (digital address information) which is a digital value that is obtained by dividing a movement range of the focus lens 105.

In AF, the camera microcomputer 206 calculates the in-focus position of the focus lens 105 based on the focus information and the focus position information generated based on the image plane phase difference pixels in the image pickup element 201 and transmits the focus driving command to the lens microcomputer 111 via the camera communication unit. In response to the focus driving command, the lens microcomputer 111 outputs a command to the focus lens controller 109 to drive the focus driving unit 113 to control the focus adjustment action.

In MF, the lens microcomputer 111 outputs a command to the focus lens controller 109 to drive the focus driving unit 113 to control the focus adjustment operation according to the amount of operation of the focus lens operation ring 110.

2. About Focus Preset Function

Figure 2:
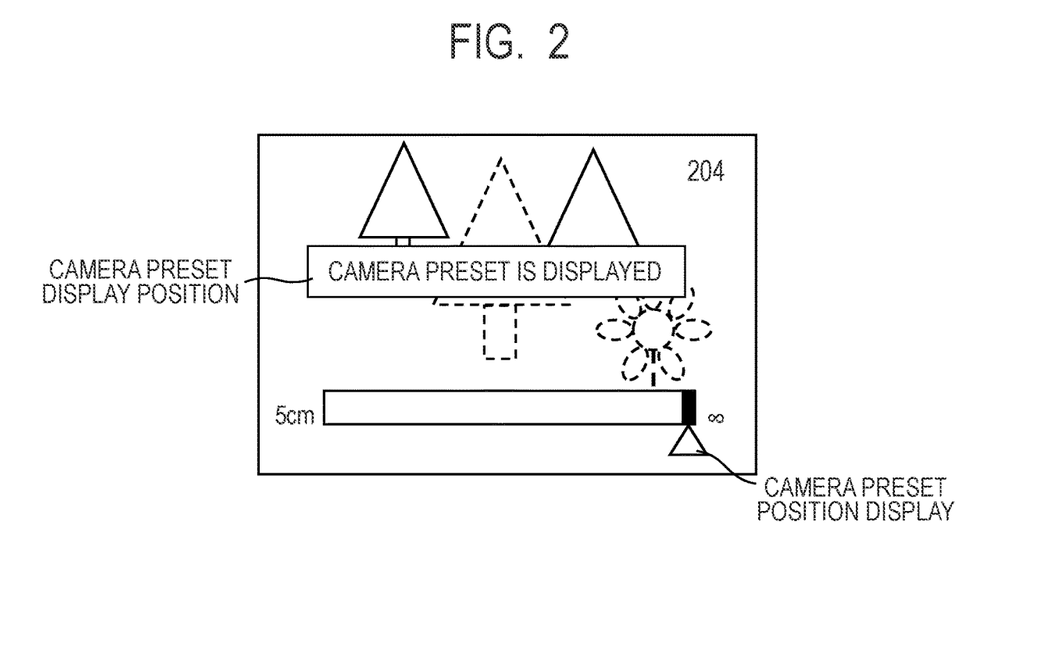
FIG. 2 is a schematic view of a camera preset registration display.
Figure 3:
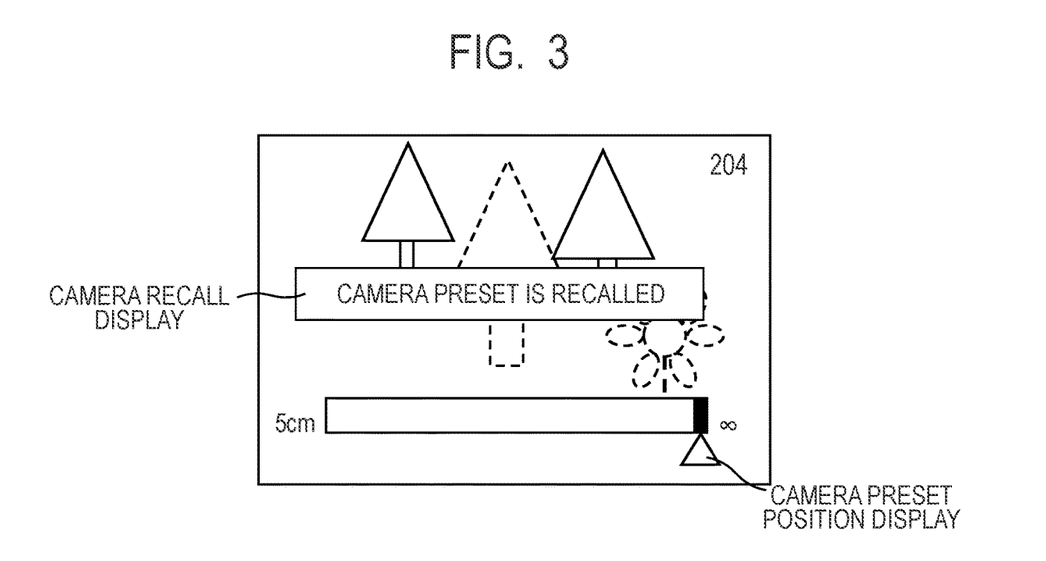
FIG. 3 is a schematic view of the camera preset recall display.

The focus preset function of the camera body 200 and the interchangeable lens 100 of embodiment 1 will be described with reference to FIGS. 1 to 3.

[About Focus Preset Function in Camera Body 200]

In the focus preset function in the camera body 200, a focus position is stored in the second focus storage unit 212 as a second registered position by an operation of the camera preset button 210. When a camera recall button 211 is operated, a recall of the focus position (the second registered position) is executed.

When the camera preset button 210 is operated, the camera microcomputer 206 acquires a focus position information from the lens microcomputer 111 via the camera communication unit and makes the second focus storage unit 212 to store the acquired focus position information. At that time, as shown in FIG. 2, a camera preset display, which is an operation information of the camera preset button 210, and a camera preset position display, which is a display of the stored position information, are displayed in the display unit 204.

When the camera recall button 211 is operated, the camera microcomputer 206 transmits a focus driving command to the lens microcomputer 111 via the camera communication unit such that the focus lens 105 moves to the focus position stored in the second focus storage unit 212. At that time, as shown in FIG. 3, a camera recall display is displayed on the display unit 204. In response to the focus driving command, the lens microcomputer 111 outputs a command to the focus lens controller 109 to drive the focus driving unit 113 and controls the focus adjustment action.

[Focus Preset Function of the Interchangeable Lens 100]

When the lens preset button 130 is operated, a focus position is stored in the first focus storage unit 132 as the first registered position. When the lens recall button 131 is operated, a recall of the focus position (the first registered position) is executed.

When the lens preset button 130 is operated, the lens microcomputer 111 acquires the focus position from the focus position sensor 112 and makes the first focus storage unit 132 store its position information (the first registered position).

When the lens recall button 131 is operated, the lens microcomputer 111 transmits a command to the focus lens controller 109 to drive the focus driving unit 113 to move the focus lens 105 to the focus position stored by the first focus storage unit 132.

3. Display of Focus Preset Function to the Camera Body 200 by the Interchangeable Lens 100

A display in the camera body 200 when the focus preset function is executed in the interchangeable lens 100 according to this embodiment will be described with reference to FIGS. 4 to 7.

Figure 4:
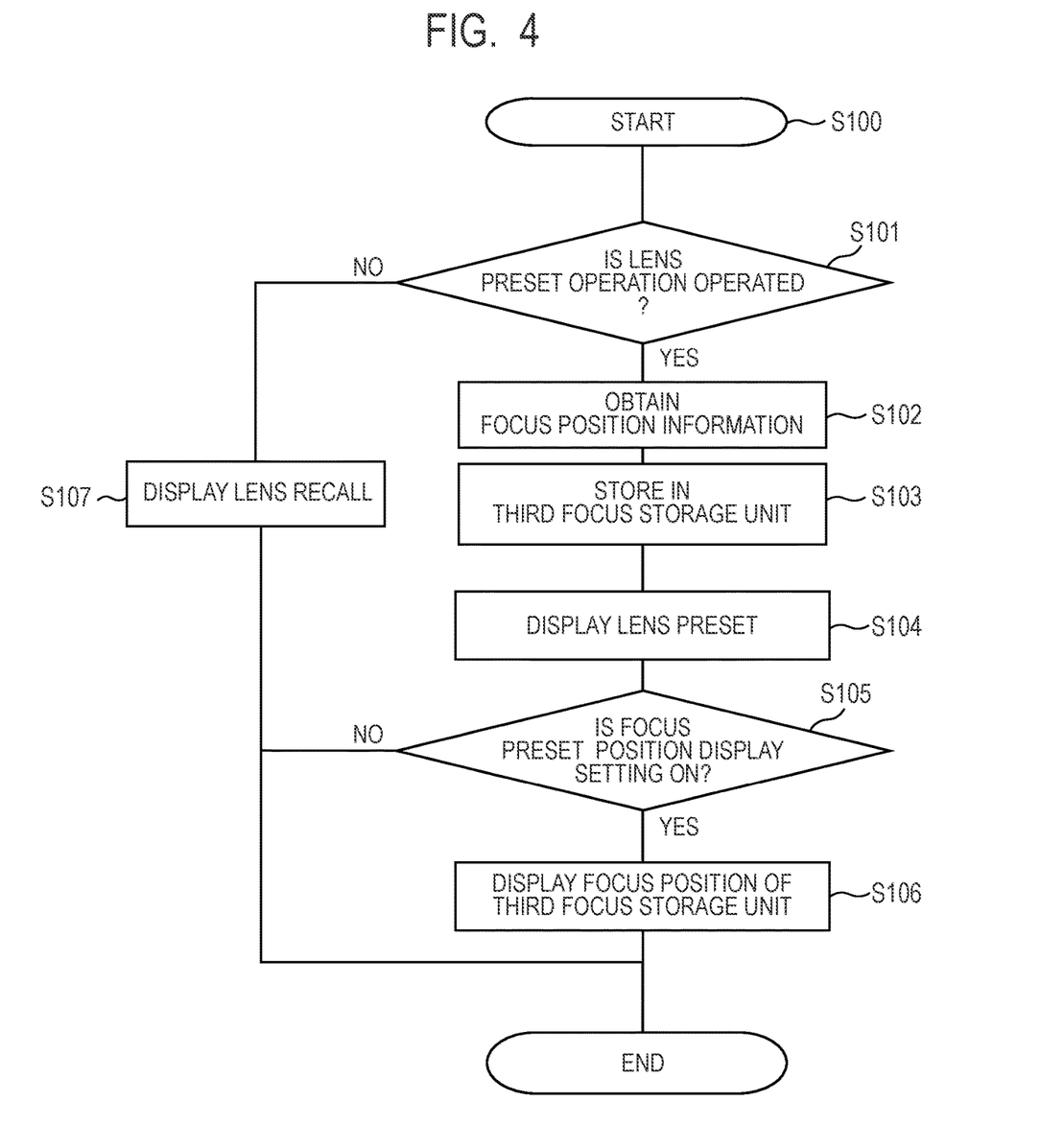
FIG. 4 is a flow chart relating to a third focus storage unit.

The camera body 200 outputs a transmission request of lens data to perform a display regarding the preset function on the display unit 204 and receives lens preset information in response. The lens preset information consists of a lens preset operation information that notifies the operation of the lens preset button 130 and lens recall operation information that notifies the operation of the lens recall button 131.

When the camera communication unit receives the lens preset information, the flow from S100 as shown in FIG. 4 is executed.

Figure 5:
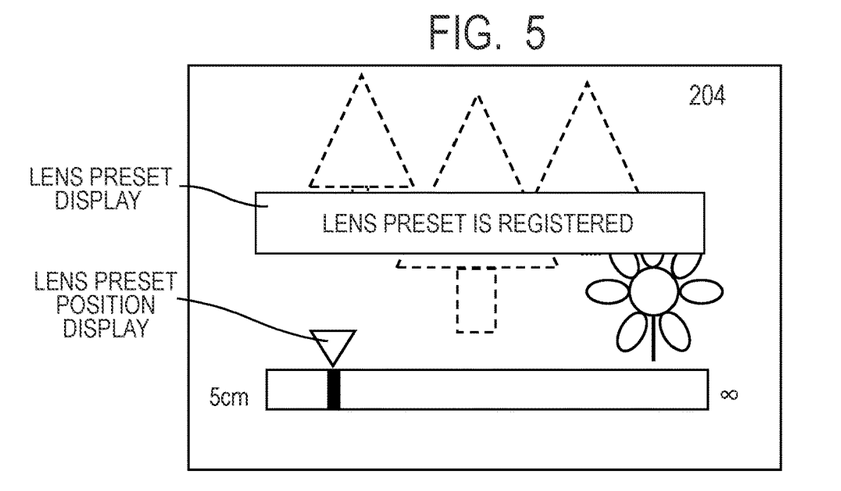
FIG. 5 is a schematic view of a lens preset registration display.

In S101, if the lens preset information is the lens preset operation information, the camera microcomputer 206 acquires the focus position information in S102. Then, in S103, the camera microcomputer 206 stores a focus position information in the third focus storage unit 213, and makes the display unit 204 display the lens preset display as shown in FIG. 5 in S104.

Then, if the focus preset position display setting is ON in S105, the camera microcomputer 206 display the focus position information stored in third focus storage unit 213 at the lens preset position display in the display unit 204 in S106.

Figure 6:
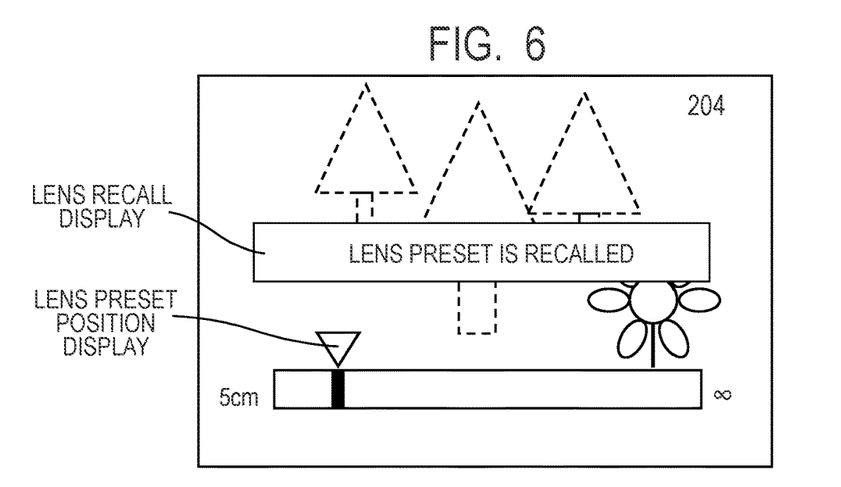
FIG. 6 is a schematic view of a lens preset recall display.

When the detected lens preset information is lens recall operation information in S101, the camera microcomputer 206 makes the lens recall display be displayed on the display unit 204 in S107 as shown in FIG. 6.

In Embodiment 1, the camera preset position display and the lens preset position display are displayed on the display unit 204 as triangular marks added on a distance bar which is to notify a focus position with one end being a close end and with the other end being an infinity end.

Figure 7:
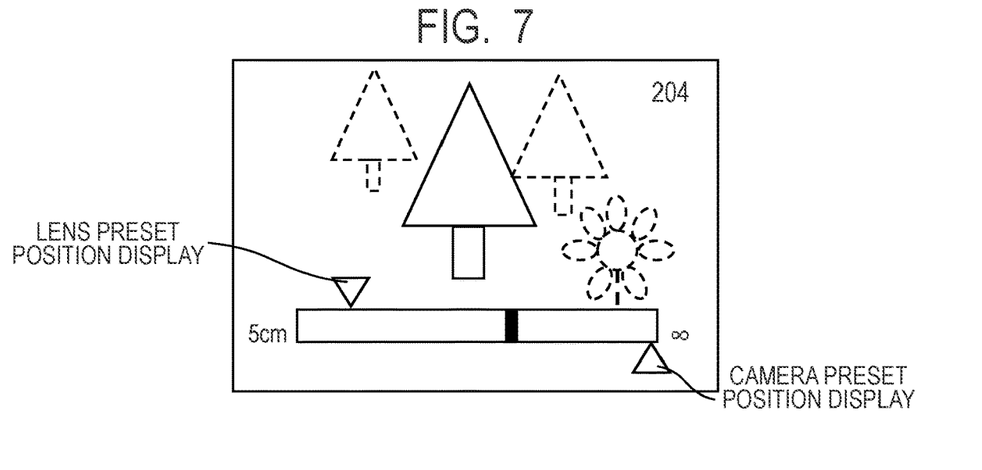
FIG. 7 is a schematic view showing a case of a preset standby.

In FIG. 7, a state in which both the camera preset position display and the lens preset position display are displayed is shown. By displaying each position display of the camera body 200 and the interchangeable lens 100 separately above and below the distance bar, the user can easily recognize which operation causes a movement to which position.

The focus position information stored in the third focus storage unit 213 in Embodiment 1 is not used as a focus driving command, but is used to grasp a rough position through the distance bar. Therefore, the focus position information need not be the detail of the image pickup distance information or the address information, but can be a resolution required for display of the distance bar, such as a 100 segmented zone information. The zone information is obtained as information of a region including a position detected by the focus position sensor 112 where the regions are defined by dividing the movement range of the focus lens 105 into several regions (zones). This is because the focus position information used here is not used for a focus driving command. Therefore, the acquisition, processing and display of the focus position information can be simplified.

According to the optical apparatus of Embodiment 1, it is easy to recognize which focus preset operation has been performed, the interchangeable lens 100 or the camera body 200.

Embodiment 2

Difference of the optical apparatus according to Embodiment 2 from Embodiment 1 will be explained with reference to FIGS. 8 and 9. Embodiment 2 differs from Embodiment 1 in that the focus preset position information is added as a lens preset information item in the lens data transmission request made by the camera microcomputer 206 via a communication means.

The focus preset position information is focus position information stored in the first focus storage unit 132, and used for the focus driving command. The focus preset position information is acquired by the camera microcomputer 206 from the lens microcomputer 111 in response to a request to send the lens data from the camera microcomputer 206 to the lens microcomputer 111.

Figure 8:
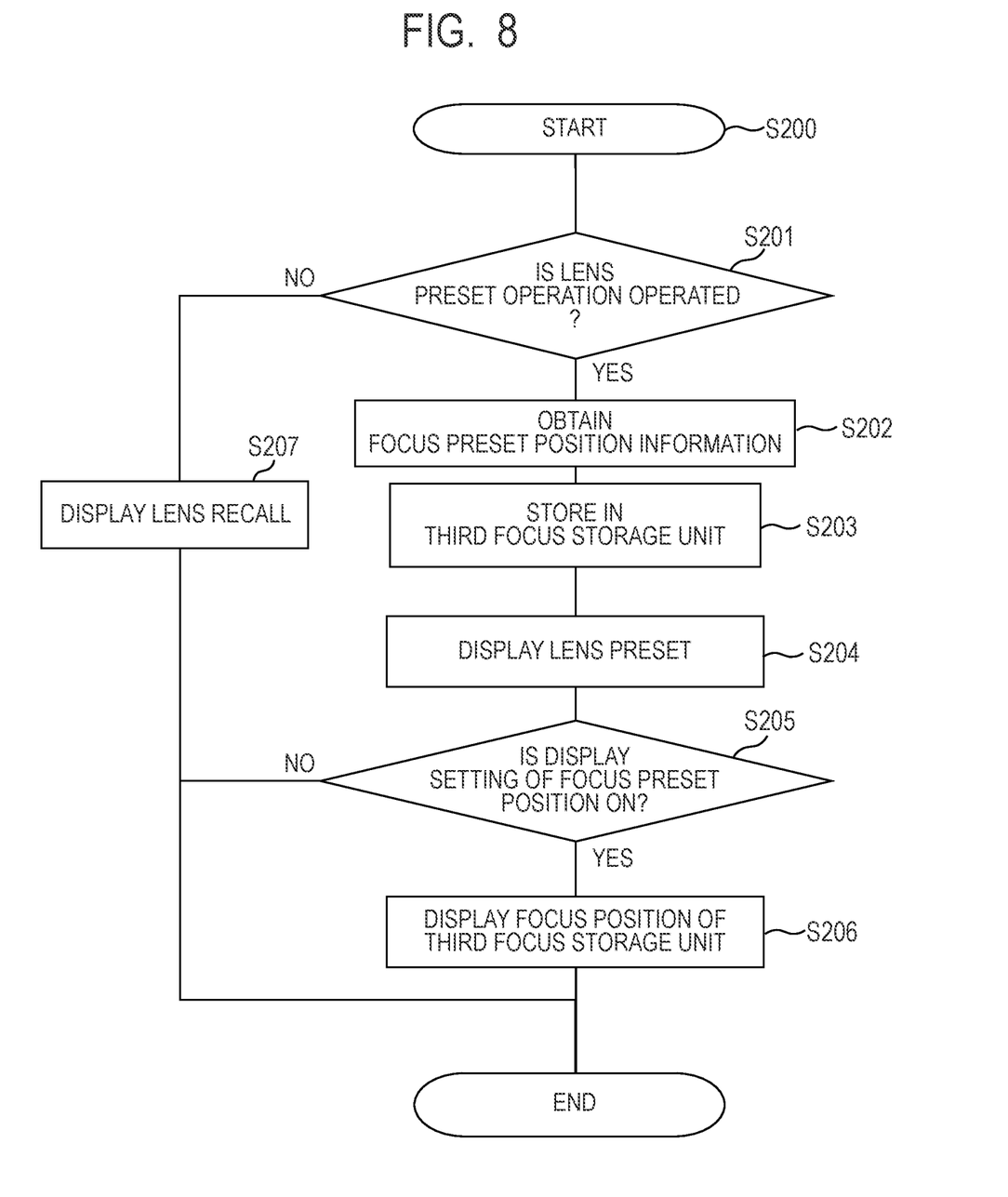
FIG. 8 is a flowchart of a modified embodiment relating to the third focus storage unit.
Figure 9:
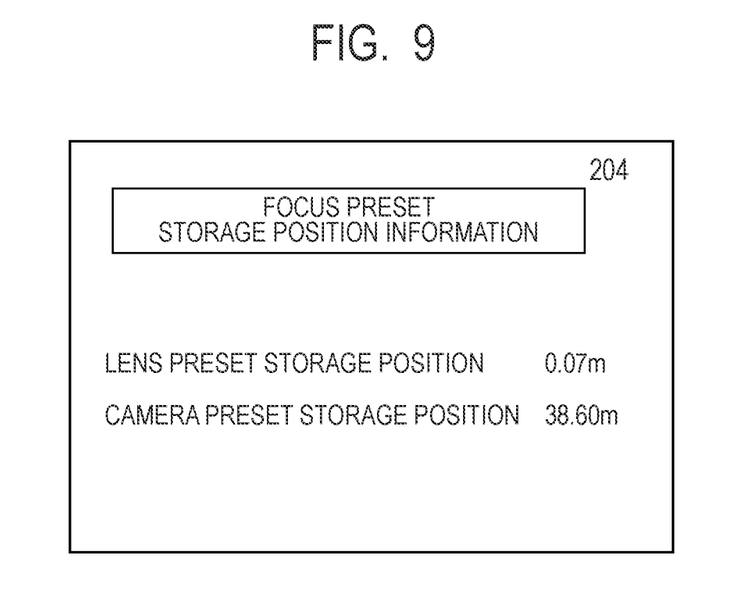
FIG. 9 is a second embodiment of a focus preset registered position information.

In S202 of FIG. 8, the focus preset position information is acquired from the interchangeable lens 100 and stored in the third focus storage unit 213 instead of the focus position information in S102 of Embodiment 1.

A focus position information that varies according to AF and MF is used in Embodiment 1, while the focus preset position information which is stored in the first focus storage unit 132 is used in Embodiment 2. In Embodiment 1, if a lens preset operation is performed while the focus lens 105 is driven, a time lag between the user operation and the S102 can cause a minute error between information stored in the first focus storage unit 132 and information stored in the third focus storage unit 213. In Embodiment 2, the generation of errors can be suppressed by acquiring the focus preset position information. Therefore, a detailed lens preset position display can be performed as shown in FIG. 9. The detailed preset position display can simplify the operation of the user when picking up of moving images and the like since detailed numerical reenactments of the focus position can be recognized.

Other Embodiment

Figure 10:
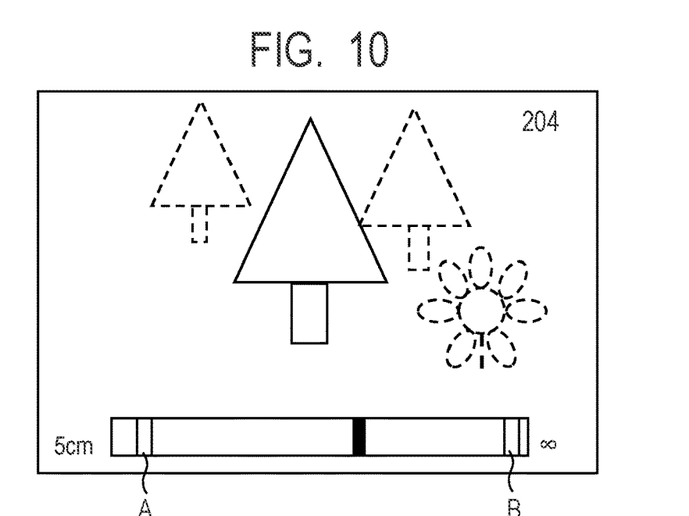
FIG. 10 shows a modified embodiment of the focus preset registered position information.
Figure 11:
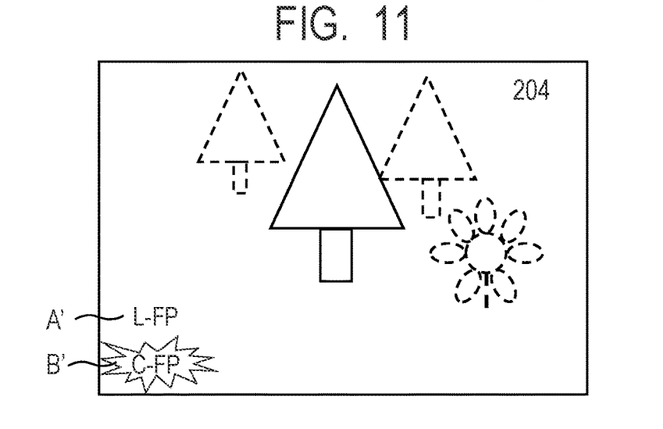
FIG. 11 shows a modified embodiment of the focus preset registered position information.

In Embodiment 1, in order to recognize the camera preset position display and the lens preset position display separately, a display with the distance bar and the triangle landmarks is adopted. However, a bar of the preset position may be provided in the distance bar as 'A' and 'B' shown in FIG. 10. In that case, the camera and the lens can be recognized, for example, by changing display colors of 'A' and 'B'. Whether or not each of the camera and the lens registered a preset position can be displayed even not registered a position information, as shown in FIG. 11. "A'" and "B'" in FIG. 11 enable the registration status to be checked by, for example, the presence or absence of blinking.

Also, it is not necessary that a display related to the focus preset in the image pickup state is always displayed, and the user may be able to check it via a menu screen. A display of FIG. 9 of Embodiment 2 can be displayed not only when the focus preset operation is performed but also when being selected it in the menu screen.

These embodiments are to reduce an area of display with respect to the focus preset function in the display unit. By reducing the display area, the users can focus more on the picking up images.

In this case, the camera preset button 210, the camera recall button 211, the lens preset button 130, and the lens recall button 131 are described as separate operating parts, but it is not necessary to provide each of these buttons separately.

For example, a modified embodiments can be adopted, such as a single operating member in which a recall is performed when being pressed for a short period of time and a preset is performed when being pressed for a long period of time, and a selector switch which switches the function of the operating member between a recall and a preset.

Figure 12:
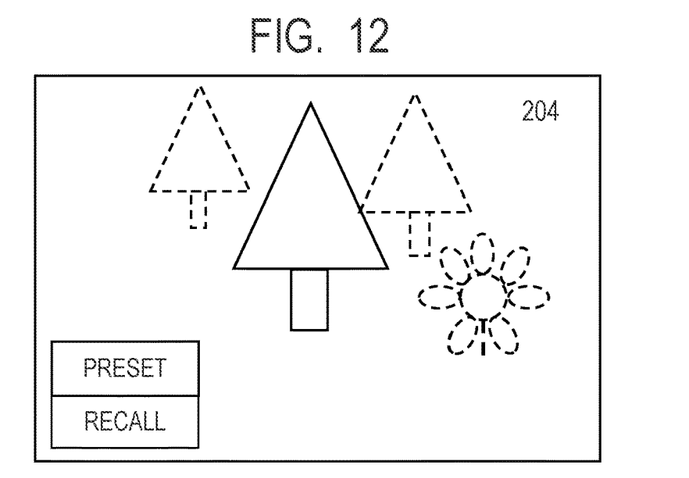
FIG. 12 shows a modified embodiment of a camera focus preset function operating unit.

The camera preset button 210 and the camera recall button 211 are not necessarily provided as a physical control but can be provided as a touch icon displayed on the display unit 204 as shown in FIG. 12.

These embodiments are modifications for the optimization of the operation units in the optical apparatus, and they are used according to a frequency of use of the focus preset function by users in the product.

While the above embodiment contains examples of setting/registering and recalling presets for focus (focus lens unit), the disclosure is not limited to this. The same can be applied to setting/registering and recalling presets for optical system, including at least one of focus, zoom (zoom lens unit) and the aperture stop, to enjoy the effects of the aspect of the embodiments.

Although the exemplary embodiment of the disclosure has been described above, the disclosure is not limited to these embodiment, and various modifications and modifications can be made within the scope of its gist.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-047760, filed Mar. 24, 2022, which is hereby incorporated by reference herein in its entirety.

What is claimed is:

1. An optical apparatus comprising a camera apparatus and a lens apparatus attachable to and detachable from the camera apparatus,
    wherein the lens apparatus comprises an optical system, a driving unit configured to drive a focus lens unit included in the optical system, a detector configured to detect a position of the focus lens unit, a first storage unit configured to store a position of the focus lens unit, a first registering operation unit configured to cause the first storage unit to store a position of the focus lens unit as a first registered position, a first recall operation unit configured to cause the driving unit to drive the focus lens unit to the first registered position, and a lens communication unit configured to communicate with the camera apparatus,
    wherein the camera apparatus comprises a camera communication unit configured to communicate with the lens apparatus and an image pickup element configured to pickup an image formed by the lens apparatus, and
    wherein an information communicated between the lens communication unit and the camera communication unit includes an operation information of at least one of the first registered operation unit and the first recall operation unit, and a position information based on a detection by the detector.

2. The optical apparatus according to claim 1, wherein the camera apparatus comprises a display unit, and
    wherein the display unit displays an operation information of at least one of the first registering operation unit and the first recall operation unit.

3. The optical apparatus according to claim 2, wherein the camera apparatus comprises a second storage unit, and
    wherein the display unit displays an information stored in the second storage unit.

4. The optical apparatus according to claim 3, wherein the second storage unit stores a position information acquired via the camera communication unit, based on a detection in the detector when the first registering operation unit is operated.

5. The optical apparatus according to claim 3, wherein the second storage unit stores the first registered position acquired via the camera communication unit.

6. The optical apparatus according to claim 3, wherein the camera apparatus comprises: a third storage unit configured to store a position of the focus lens unit; a second registering operation unit configured to cause the third storage unit to store a position of the focus lens unit as a second registered position; and a second recall operation unit configured to output a command to the second registered position to drive the focus lens unit to the lens apparatus via camera communication unit.

7. The optical apparatus according to claim 1, wherein the position information includes at least one of address information detected by the detector, characteristic information obtained based on the address information, and an information of a region including a position detected by the detector where the region is one of a plurality of regions obtained by dividing a moving range of the focus lens unit.

8. The optical apparatus according to claim 1, wherein the optical system includes a zoom lens unit.

9. The optical apparatus according to claim 1, wherein the optical system includes an aperture stop.

10. A lens apparatus attachable to and detachable from a camera apparatus,
   wherein the lens apparatus comprises an optical system, a driving unit configured to drive a focus lens unit included in the optical system, a detector configured to detect a position of the focus lens unit, a first storage unit configured to store a position of the focus lens unit, a first registering operation unit configured to cause the first storage unit to store a position of the focus lens unit as a first registered position, a first recall operation unit configured to cause the driving unit to drive the focus lens unit to the first registered position, and a lens communication unit configured to communicate with the camera apparatus,
   wherein the camera apparatus comprises a camera communication unit configured to communicate with the lens apparatus and an image pickup element configured to pickup an image formed by the lens apparatus, and
   wherein an information communicated between the lens communication unit and the camera communication unit includes an operation information of at least one of the first registered operation unit and the first recall operation unit, and a position information based on a detection by the detector.

11. The lens apparatus according to claim 10, wherein the camera apparatus comprises a display unit, and
   wherein the display unit displays an operation information of at least one of the first registering operation unit and the first recall operation unit.

12. The lens apparatus according to claim 10, wherein the camera apparatus comprises a second storage unit, and
   wherein the display unit displays an information stored in the second storage unit.

13. The lens apparatus according to claim 12, wherein the second storage unit stores a position information acquired via the camera communication unit, based on a detection in the detector when the first registering operation unit is operated.

14. The lens apparatus according to claim 12, wherein the second storage unit stores the first registered position acquired via the camera communication unit.

15. The lens apparatus according to claim 12, wherein the camera apparatus comprises: a third storage unit configured to store a position of the focus lens unit; a second registering operation unit configured to cause the third storage unit to store a position of the focus lens unit as a second registered position; and a second recall operation unit configured to output a command to the second registered position to drive the focus lens unit to the lens apparatus via camera communication unit.

16. The lens apparatus according to claim 10, wherein the position information includes at least one of address information detected by the detector, characteristic information obtained based on the address information, and an information of a region including a position detected by the detector where the region is one of a plurality of regions obtained by dividing a moving range of the focus lens unit.

17. The lens apparatus according to claim 10, wherein the optical system includes a zoom lens unit.

18. A camera apparatus,
   wherein a lens apparatus attachable to and detachable from the camera pickup apparatus,
   wherein the lens apparatus comprises an optical system, a driving unit configured to drive a focus lens unit included in the optical system, a detector configured to detect a position of the focus lens unit, a first storage unit configured to store a position of the focus lens unit, a first registering operation unit configured to cause the first storage unit to store a position of the focus lens unit as a first registered position, a first recall operation unit configured to cause the driving unit to drive the focus lens unit to the first registered position, and a lens communication unit configured to communicate with the camera apparatus,
   wherein the camera apparatus comprises a camera communication unit configured to communicate with the lens apparatus and an image pickup element configured to pickup an image formed by the lens apparatus, and
   wherein an information communicated between the lens communication unit and the camera communication unit includes an operation information of at least one of the first registered operation unit and the first recall operation unit, and a position information based on a detection by the detector.

* * * * *